United States Patent [19]

Beaumont et al.

[11] 4,136,151
[45] Jan. 23, 1979

[54] PHOSPHORIC ACID PRODUCTION

[75] Inventors: Thomas N. Beaumont; Norman Robinson, both of Felixstowe; Geoffrey N. Quinton, Kirton near Ipswich, all of England

[73] Assignee: Fisons Limited, London, England

[21] Appl. No.: 824,954

[22] Filed: Aug. 15, 1977

Related U.S. Application Data

[63] Continuation of Ser. No. 592,316, Jul. 1, 1975, abandoned.

[30] Foreign Application Priority Data

Jul. 6, 1974 [GB] United Kingdom ............... 30042/74
Aug. 8, 1974 [GB] United Kingdom ............... 34963/74
Sep. 25, 1974 [GB] United Kingdom ............... 41668/74
Feb. 15, 1975 [GB] United Kingdom ................. 6493/75

[51] Int. Cl.$^2$ ...................... C01F 11/46; C01B 25/16
[52] U.S. Cl. .................................... 423/166; 423/167; 423/319
[58] Field of Search ............... 423/167, 319, 320, 321, 423/555, 166

[56] References Cited

U.S. PATENT DOCUMENTS 3,562,769  2/1971  Sugahara et al. .................... 423/320

FOREIGN PATENT DOCUMENTS 763871  7/1967  Canada .................................... 423/321
4614815  4/1971  Japan ..................................... 423/555
4716417  5/1972  Japan ..................................... 423/555

OTHER PUBLICATIONS

Slack, Phosphoric Acid, part I, Marcel Dekker, Inc., New York (1968), pp. 102–105.

Primary Examiner—O. R. Vertiz
Assistant Examiner—Wayne A. Langel
Attorney, Agent, or Firm—Wenderoth, Lind & Ponack

[57] ABSTRACT

The filtration rate and/or washability of crystals of gypsum produced during the wet process for the production of phosphoric acid are improved by adjusting the notional $Al_2O_3:P_2O_5$ and reactive $SiO_2:F$ ratios of the phosphate rock to within certain ranges. The adjustment may be achieved by addition of sources of aluminium and silica to the phosphoric acid process.

16 Claims, No Drawings

PHOSPHORIC ACID PRODUCTION

This is a continuation of application Ser. No. 592,316, filed July 1, 1975, now abandoned.

The present invention relates to a process for producing phosphoric acid.

In the production of phosphoric acid by the wet process, a phosphatic material, usually phosphate rock, is acidulated with an acid, e.g. a mineral acid notably sulphuric acid, to give phosphoric acid and calcium sulphate. In the gypsum process the calcium sulphate is precipitated as gypsum, which is separated off from the phosphoric acid, e.g. on a rotary tilting pan filter. The filter cake usually retains some of the phosphoric acid thereon and this is recovered by washing the filter cake with water. However, problems are often encountered due to poor filtration of the gypsum from the phosphoric acid and/or poor washability of the gypsum filter cake. Poor filtration leads to a lower throughput of material through a given filter area, and poor washability leads to high $P_2O_5$ losses from the reaction system.

The occurence of poor filtration and washability of the gypsum, notably from some phosphate rocks, has been a known problem for some time, and there has been considerable research over the past 30 years or more for a method for overcoming these problems.

We have surprisingly now found that if aluminum and reactive silica are present in certain proportions during treatment of the phosphatic material the filtration rate and/or washability of the filter cake produced is improved and that the use of the aluminium with the silica offers an economic method for improving the filtration rate and/or washability of the gypsum filter cake, especially when phosphate rocks low in aluminium and/or silica are used.

The desired proportions of aluminium and silica may be achieved by the use of a phosphatic material whose contents of aluminium and silica have been adjusted, e.g. during or after beneficiation, to the desired levels; or by the addition of sources of aluminium and silica to the phosphoric acid process.

Thus, from one aspect the present invention provides in a process for the production of phosphoric acid by the treatment of a phosphatic material with an acid, precipitating calcium sulphate and separating off the calcium sulphate as calcium sulphate dihydrate, the improvement which comprises supplementing the notional weight ratios of total $Al_2O_3$: total $P_2O_5$ and total reactive $SiO_2$: total F in the phosphatic material, so that they have values within the range 1:75 to 1:10 and up to 1:1 respectively, prior to the initial precipitation of the calcium sulphate dihydrate. The adjustment of the ratios may be achieved either by additions of sources of aluminium and reactive silica to the phosphatic material before it is fed to the reaction system and/or by the addition of such sources to the reaction system at or before the point at which the calcium sulphate dihydrate first precipitates or to a part of the reaction mixture which is being recycled to a point of reintroduction which is at or before the point at which the calcium sulphate dihydrate first precipitates.

It is also within the scope of the present invention to use as feed material a phosphatic material whose $Al_2O_3:P_2O_5$ and $SiO_2:F$ weight ratios have already been adjusted to the desired levels, e.g. during or after beneficiation of phosphate rock at a mine. The invention therefore also provides in a process for the production of phosphoric acid by the treatment of a phosphatic material with an acid, precipitating calcium sulphate and separating off the calcium sulphate as calcium sulphate dihydrate, the improvement which comprises using a phosphatic material which has had the weight ratios of total $Al_2O_3$:total $P_2O_5$ and total reactive $SiO_2$:total F therein adjusted in a previous stage to values within the ranges 1:75 to 1:10 and up to 1:1 respectively.

The invention further provides a method for producing a phosphate rock suitable for use in the process of the invention which comprises modifying a process for beneficiating a phosphate rock whereby sources of aluminium and reactive silica are added to or retained in the phosphate rock so as to produce a phosphate rock having weight ratios of total $Al_2O_3$:total $P_2O_5$ and total reactive $SiO_2$:total F in the ranges 1:75 to 1:10 and up to 1:1 respectively.

The term beneficiation is used herein to denote any process or part thereof in which a phosphate rock is treated so as to render it more suitable for its end use. Thus, it includes the steps of crushing, flotation, classification and calcination; and modification of the beneficiation process includes the adjustment of the ratios by the addition of additives to a rock which has completed a normal beneficiation process. The modification of the beneficiation process may be carried out at any suitable point in the process and in a number of ways. Thus, the flotation and/or classification processes may be altered so as to retain a higher than usual proportion of fine material, since this fine material often contains high proportion of $Al_2O_3$ and reactive $SiO_2$. Alternatively, suitable sources of aluminium and reactive silica may be added to the rock during its crushing and/or calcination.

The phosphoric acid process of the invention gives rise to crystals of calcium sulphate dihydrate in which the washing and filtration is facilitated. Some of these crystals are characterised in that at least 50% by weight of the calcium sulphate dihydrate crystals therein have a length to breadth ratio in the range 1:1 to 3:1, a mean thickness of from 3 to 10 micrometers and at least 15% by weight of the crystals are in the form of twinned crystals.

The invention therefore provides a novel form of crystals of calcium sulphate dihydrate characterised in that at least 50% by weight of the calcium sulphate dihydrate crystals have a length to breadth ratio in the range 1:1 to 3:1; in that the crystals have a mean thickness of from 3 to 10 micrometers; and in that at least 15% by weight of the crystals are in the form of twinned crystals.

The invention also provides a process which comprises treating phosphate rock with an acid, precipitating calcium as calcium sulphate and separating off the calcium sulphate as calcium sulphate dihydrate characterised in that the calcium sulphate dihydrate is produced in the form of crystals in which at least 50% by weight have a length to breadth ratio of from 1:1 to 3:1, a mean thickness of from 3 to 10 micrometers and at least 20% by weight are in the form of twinned crystals; and preferably in that the weight ratios of total $Al_2O_3$:total $P_2O_5$ and total reactive $SiO_2$: total F in the reaction slurry from which the calcium sulphate dihydrate crystallises lie within the ranges 1:75 to 1:10 and up to 1:1 respectively.

The invention is of especial use in the preparation of phosphoric acid by the acidulation of a phosphate rock with a mineral acid, e.g. sulphuric acid alone or in admixture with phosphoric acid. As indicated above, the phosphate rock may already have $Al_2O_3:P_2O_5$ and reactive $SiO_2$:F ratios within the ranges specified above. In this case satisfactory results may be achieved without further modification of the $Al_2O_3:P_2O_5$ and reactive $SiO_2$:F ratios. However, we have found that often the filtration rate and/or washability of the filter cake obtain using such rocks can be yet further improved if the amounts of $Al_2O_3$ and reactive $SiO_2$ are raised yet further, preferably so that the ratios of total F:total $P_2O_5$ and total reactive $SiO_2$:total F lie in the ranges 1:66 to 1:15, notably 1:55 to 1:30, and 0.5:1 to 0.1:1 notably 0.3:1 to 0.14:1 respectively.

For convenience the present invention will be described in terms of a phosphoric acid process utilising a phosphate rock which requires the addition of aluminium and reactive silica thereto, rather than in terms of the use of a rock whose beneficiation has been modified as outlined above.

The process of the invention is essentially the same as a conventional gypsum process for the production of phosphoric acid, except that aluminium and silica are added to the reaction system. The invention may thus be applied to a process in which phosphate rock is digested with sulphuric acid or a mixture of sulphuric and phosphoric acids, in which case the calcium is precipitated directly as calcium sulphate dihydrate; or to a process in which the calcium sulphate dihydrate is precipitated indirectly, as in a process where the calcium sulphate is initially formed as the hemihydrate and then recrystallised in situ (e.g. by cooling and/or by adding sulphuric acid) to the dihydrate.

In the process of the invention, the aluminium and silica are incorporated into the reaction system so as to be present in any liquor in which gypsum crystals are first precipitated (hereinafter referred to as the liquor). It will be appreciated that, whilst the aluminium and silica should go into solution in the liquor, they may in fact come out of solution at a later point in the process. Typical sources of aluminium for present use include aluminium silicates which contain at least 10% by weight of $Al_2O_3$, for example china clay, ball clay, attupulgite clay, montmorillonite, fuller's earth, high aluminium phosphate rocks and residues from the beneficiation of phosphate rocks. It will be appreciated that mixtures of aluminium silicates may be used. The aluminium may also be used in the form of a salt or compound thereof other than the silicate. Such other forms of salt or compound include elemental aluminium, e.g. powder aluminium; aluminium sulphate and its hydrates; aluminium oxides; alums, e.g. ammonium alum; aluminium phosphate; and aluminium hydroxide. It will be appreciated that mixtures of aluminium salts or compounds may be used.

The silica is preferably used in chemical combination with the aluminium, i.e. as an aluminium silicate such as those described above. However, where this is not done, the silica is used in a form which contains less than 10% by weight $Al_2O_3$ and is reactive, i.e. in a form which is dissolved in the liquor and reacts with the fluorine in the rock. Suitable forms of silica for present use thus include silica, silica gel, sodium silicate and mineral silicates, e.g. kieselguhr. For convenience the invention will be described hereinafter in terms of the use of aluminium silicate rather than in terms of the separate addition of aluminium and reactive silica.

In order to aid rapid dissolution of the aluminium silicate in the reaction mixture, it may be preferred to use the aluminium silicate in the form of a fine powder, e.g. with the majority of its particles in the size range 1 to 600 micrometers. If desired, the aluminium silicate may be used in the form of a solution thereof in phosphoric acid, sulphuric acid, or some other suitable solvent, e.g. water.

The aluminium silicate may be added directly to the reaction system at any suitable point provided that it ultimately finds its way into the liquor. Thus, it may be added to the initial attack stage when the phosphate rock is reacted with the mineral acid (e.g. by feeding the requisite proportion of aluminium silicate separately or in admixture with the phosphate rock feed) to the attack stage; aluminium silicate may also be added to the mineral acid feed; or aluminium silicate may be added to a recirculating liquor or slurry (e.g. to recycling slurry of phosphoric acid and gypsum or to the return dilute acid washings from the filter on which the phosphoric acid and gypsum are separated) which is to form part of the liquor. The aluminium silicate can be added at one location or at several locations.

Preferably the aluminium silicate is the sole additive or is used in conjunction with one or more other active additives, preferably selected from calcium sulphate crystal habit modifiers, diatomaceous earths, potassium salts, flocculating agents and defoaming agents.

The term additive is used herein to denote only those materials which are incorporated in a small amount, that is less than 10% by weight of the rock fed to the system, into the reaction system. It does not include major reactants, e.g. materials such as phosphoric and sulphuric acids and salts thereof, which are used in more than 10%. The additive must also be an active one, that is it is one which has a significant effect on the process and/or reacts with or modifies a feed material, an intermediate product or a final product. Thus, inert diluents are not deemed to fall within the term 'additive' as used herein.

The phosphate rocks to which the invention is applicable include sedimentary rocks, e.g. North Carolina, Sahara 80% BPL, Djebel Onk, Lowgrade Khouribga 72% BPL, Sahara 75% BPL, Youssoufia and Khouribga 75/77% BPL; and igneous rocks, e.g. Jacupiranga, Phalaborwa and Kola. These rocks have typical weight ratios of $Al_2O_3$ to $P_2O_5$ of from 1:56 for Kola to 1:245 for Phalaborwa Rock. The ratios quoted above are in respect of the phosphate rock feed materials for present use. These ratios are often lower than the rock as mined since the beneficiation processes, e.g. washing, flotation, and/or grinding processes, may result in the removal of fine particles of aluminium silicate from the rock. These fine particles constitute a potential source of aluminium silicate for use in the process of the invention and are 'the residues from the beneficiation of phosphate rock' referred to earlier.

In general the improvement in filtration rate and/or washability of the gypsum crystals will depend upon the initial $Al_2O_3:P_2O_5$ and reactive $SiO_2$:F values of the phosphate rock and the amount of aluminium silicate added. The amount of aluminium silicate added in each case to achieve a given improvement will vary and, furthermore, may be governed by commercial considerations.

Also, where very large amounts of aluminium silicate are added, much of this may find its way into the product phosphoric acid and this is undesirable. We therefore prefer not to raise the $Al_2O_3:P_2O_5$ ratio to a value greater than 1:15, notably to not more than 1:20. The invention is of especial use in the treatment of a phosphate rock having an initial $Al_2O_3:P_2O_5$ ratio of less than 1:75 so as to raise the ratio to within the range 1:75 to 1:10. Alternatively, the phosphate rock may have an initial $Al_2O_3:P_2O_5$ ratio already within the range 1:75 to 1:10 and be treated so as to raise this ratio to a higher value within the range so as to improve the properties of the gypsum obtained. We prefer that the ratio achieved in each case be greater than 1:66, preferably greater than 1:55. Notably the ratio achieved should lie in the range 1:66 to 1:30, more especially 1:55 to 1:30. In most cases it will be necessary to add at least 0.1% by weight of $Al_2O_3$ based on the weight of the rock used.

The amount of reactive silica to be added will depend upon the rock used and the form of aluminium added. Where an aluminium silicate is used, a certain amount of silica is of necessity also added, usually in a weight ratio of from 1:1 to 5:1 based on the $Al_2O_3$ added, and we have found that the amount of silica added in this way is usually adequate. The reactive silica combines with the fluorine in the phosphate rock and the amount of reactive silica to be added therefore depends upon the initial reactive silica and fluorine contents of the rock. Where the fluorine content is high and the reactive silica content is low, significant amounts of reactive silica may need to be added, that is the total reactive silica: total F ratio may have to be raised to a high value in the range 0.14:1 to 1:1. However, it is preferred that the notional weight ratio of total reactive silica to total fluorine ($SiO_2$:F ratio) in the phosphate rock after adjustment or supplementation of the $SiO_2$:F ratio should have a value of up to but not exceeding 0.5:1. As with the addition of aluminium, the phosphate rock may already have sufficient reactive silica to have a total reactive $SiO_2$:total F weight ratio within the range 0.1:1 to 0.5:1 and yet useful improvements in filtration rate and/or washability may be achieved by the addition of further reactive silica so as to raise the reactive silica to fluorine weight ratio to a higher value approaching 0.5:1. Thus, we usually prefer in all cases to add at least 0.1%, e.g. 0.2 to 1%, by weight of reactive silica (as aluminium silicate and/or as a separate source of silica) based on the $P_2O_5$ in the phosphate rock.

The new crystals of gypsum produced by processes wherein the $Al_2O_3:P_2O_5$ and $SiO_2$:F ratios are held with the ranges given above are characterised in that they have at least 50% by weight thereof having a length to breadth ratio in the range 1:1 to 3:1, preferably at least 80% (e.g. 90% or more) have a length to breadth ratio in the range 1:1 to 3:1; and have a mean thickness of from 3 to 10 micrometers. This is in marked contrast to crystals produced without the aluminium silicate which often have much more elongated crystals. The new crystals produced by the process of the invention are also characterised in that they contain at least 15% by weight thereof in the form of X shaped twins and clusters of crystals radiating from a nucleus, the term 'twinned crystals' as used herein including both X twins and clusters. Typically 40 to 80% by weight of the crystals are in this form.

As indicated above, the aluminium silicate may be the sole additive incorporated into the reaction system. However, it is often necessary to use other additives in a gypsum process, e.g. to suppress foam. It is therefore within the scope of the present invention to incorporate certain other additives into the reaction system in addition to the aluminium silicate. These other additives are: crystal habit modifiers for calcium sulphate crystals, e.g. wetting agents of the alkylbenzene sulphonate type (although the use of habit modifiers will usually be unnecessary in addition to the aluminium silicate); defoaming agents to reduce foaming during the reaction of the acids and the phosphate rock; flocculating agents to aid coagulation and removal of fine particles in the phosphoric acid (these agents usually being added to the phosphoric acid before it is filtered off from the calcium sulphate, but are returned to the reaction system in acid which is recycled to the reaction system as is the conventional practice); and potassium salts, notably potassium sulphate or nitrate. The form of these other additives and the amounts in which they are used are essentially the same as in a conventional process for the manufacture of phosphoric acid.

The invention will now be illustrated by the following Examples in which all parts and percentages are by weight unless stated otherwise.

EXAMPLE 1

Phosphoric acid was prepared from Youssoufia phosphate rock by treatment with sulphuric acid. The rock contained 31.8% $P_2O_5$, 0.30% $Al_2O_3$, and 0.7% reactive silica, and 4.25% F.

The process was carried out in a multicompartment vessel as described in our BP No. 1000791 with phosphate rock being fed to the first compartment at a rate of 5.6 parts per hour and sulphuric acid (94.9% $H_2SO_4$) being fed to compartment C at a rate of 4.92 parts per hour. Reaction mixture was recycled from compartment C to the first compartment via the draft tube at a recycle ratio of 21:1. Product slurry was removed from compartment d and its rate of filtration on a vacuum filter measured.

The process was carried out first with no aluminium silicate added. The product slurry filtered at a rate of 3.1 tons per day of $P_2O_5$ per square meter of filter area. The crystals of gypsum were of long needle shape (length to breadth 4:1 to 15:1) and less than 5% of the crystals were in cluster form.

The process was then repeated except that ball clay (33% $Al_2O_3$, 51% reactive $SiO_2$) was incorporated into the rock feed at a rate of 0.05 parts per hour (1% on the rock) to raise the $Al_2O_3:P_2O_5$ and reactive $SiO_2$:F weight ratios to 1:53 and 0.25:1 respectively. The filtration rate improved to 5.0 tons per day of $P_2O_5$ per square meter of filter area and the crystals were altered from needle crystals to clusters with a length:breadth ratio of from 1:1 to 3:1, a mean crystal thickness of from 3 to 5 micrometers and 40 to 60% of the crystals were twinned.

EXAMPLE 2

The process of Example 1 was repeated with other rock samples and the results are set out below:

| $Al_2O_3:P_2O_5$ | | Reactive $SiO_2$:F | |
|---|---|---|---|
| Initial | After Additive | Initial | After Additive |
| 1.106 | 1.54 | 0.14:1 | 0.19:1 |
| 1.92 | 1.48 | 0.1:1 | 0.15:1 |
| 1.69 | 1.41 | 0.28:1 | 0.32:1 |

| Filtration rate per unit area | | % cluster crystals | | length:breadth ratio | |
|---|---|---|---|---|---|
| No Additive | Additive | No Additive | Additive | No Additive | Additive |
| 2.3 | 5.9 | 5% | 60% | 4:1 to 15:1 | 1:1 to 3:1 |
| 3.8 | 5.8 | 5% | 40% | 3:1 to 10:1 | 1:1 to 3:1 |
| 4.8 | 6.5 | 10% | 80% | 1:1 to 3:1 | 1:1 to 2:1 |

It was noted that the crystals obtained by addition of the additive had a mean particle size by weight of between 30 and 200 micrometers and that 50% of the particles were between 50 and 150 micrometers.

We have also found that addition of aluminium using the process of the invention produces a crystalline gypsum which contains a lower proportion of co-crystallised aluminium than is achieved when no aluminium is added. Thus, when ball clay is added to raise the $Al_2O_3:P_2O_5$ weight ratio in a low grade Moroccan phosphate rock to 1:56 from 1:123, the filtration rate was increased by 33% and the aluminium in the crystals was reduced from 0.04% to 0.01% by weight. The aluminium content of the crystals was determined by slurrying 2.5 g of the crystals in 100 ml distilled water and filtering off the crystals so as to produce clean crystals. The fact that one reduces the content of co-crystallised aluminium by the addition of aluminium to the reaction system is most surprising and unexpected. The reduction in the aluminium content of the crystals is of particular advantage where the crystals are to be used in the production of building products.

We claim:

1. In a process for the production of phosphoric acid by the treatment of phosphatic material with an acid, precipitating calcium sulphate and separating off the calcium sulphate as calcium sulphate dihydrate, the improvement which comprises improving the filtration and washing of the calcium sulphate dihydrate cyrstals by supplementing the overall amount of $Al_2O_3$ and $SiO_2$ provided by the phosphatic material so that the overall weight ratios of total $Al_2O_3:P_2O_5$ and total reactive $SiO_2$:total F fed to the reaction system prior to the initial precipitation of the calcium sulphate dihydrate have values within the range of 1:75 to 1:10 and up to 1:1, respectively.

2. A process according to claim 1 wherein the weight ratio of total $Al_2O_3$:total $P_2O_5$ is supplemented from a value within the range 1:75 to 1:10 to a higher value within the range 1:75 to 1:10.

3. A process as claimed in claim 1 wherein the weight ratio of total $Al_2O_3$:total $P_2O_5$ is supplemented to lie within the range 1:55 to 1:30.

4. A process as claimed in claim 1 wherein the weight ratio of total reactive $SiO_2$:total F is supplemented to lie within the range 0.1:1 to 0.5:1.

5. A process as claimed in claim 1 wherein the weight ratio of total reactive silica to total F provided by the phosphatic material is supplemented to within the range 0.14:1 to 0.3:1.

6. A process as claimed in claim 1 wherein the $Al_2O_3$ and $SiO_2$ is supplemented by adding aluminium silicate to the reaction system.

7. In a process for the production of phosphoric acid by the treatment of a phosphatic material with an acid, precipitating calcium sulphate and separating off the calcium sulphate as calcium sulphate dihydrate, the improvement which comprises improving the filtration and washing of the calcium sulphate dihydrate crystals by adding reactive silica and at least 0.1% by weight (expressed as $Al_2O_3$) based on the weight of $P_2O_5$ in the phosphate rock of aluminium into the reaction system prior to the initial precipitation of calcium sulphate dihydrate so that the overall weight ratios of total $Al_2O_3$:total $P_2O_5$ and total reactive $SiO_2$:total F in the reaction system are raised to values in the ranges of 1:75 to 1:10 and up to 1:1, respectively.

8. A process according to claim 7 wherein the weight ratio of total $Al_2O_3$:total $P_2O_5$ is supplemented from a value within the range 1.75 to 1:10 to a higher value within the range 1:75 to 1:10.

9. A process as claimed in claim 7 wherein the weight ratio of total $Al_2O_3$:total $P_2O_5$ is supplemented to lie within the range 1:55 to 1:30.

10. A process as claimed in claim 7 wherein the weight ratio of total reactive $SiO_2$:total F is supplemented to lie within the range 0.1:1 to 0.5:1.

11. A process as claimed in claim 7 wherein the notional weight ratio of total reactive silica to total F in the phosphatic material is supplemented to within the range 0.14:1 to 0.3:1.

12. In a process for the production of phosphoric acid by the treatment of a phosphatic material with an acid, precipitating calcium sulphate and, separating off the calcium sulphate as calcium sulphate dihydrate, the improvement which comprises adding sources of reactive $SiO_2$ and aluminum to the phosphatic material, prior to its use in the process of producing phosphoric acid, so that the phosphatic material has the weight ratios of total $Al_2O_3$:total $P_2O_5$ and total reactive $SiO_2$:total F within the ranges of 1:75 to 1:10 and up to 1:1, respectively.

13. A process according to claim 12 wherein the weight ratio of total $Al_2O_3$:total $P_2O_5$ is supplemented from a value within the range 1:75 to 1:10 to a higher value within the range 1:75 to 1:10.

14. A process as claimed in claim 12 wherein the weight ratio of total $Al_2O_3$:total $P_2O_5$ is supplemented to lie within the range 1:55 to 1:30.

15. A process as claimed in claim 12 wherein the weight ratio of total reactive $SiO_2$:total F is supplemented to lie within the range 0.1:1 to 0.5:1.

16. A process as claimed in claim 12 wherein the weight ratio of total reactive silica to total F in the phosphatic material is supplemented to within the range 0.14:1 to 0.3:1.

* * * * *